United States Patent Office 3,332,944
Patented July 25, 1967

3,332,944
ANTIBIOTIC DERIVATIVES OF MITOMYCINS A, B, C AND PORFIROMYCIN
Donna Bernice Cosulich, Pearl River, James Burns Patrick, Suffern, and Richard Preston Williams, Tomkins Cove, N.Y., assignors to American Cyanamid Company, Stamford, Conn., a corporation of Maine
No Drawing. Filed Nov. 2, 1964, Ser. No. 408,332
10 Claims. (Cl. 260—247.2)

This application is a continuation-in-part of our copending application Ser. No. 250,027 filed Jan. 8, 1963, now abandoned, which in turn is a continuation-in-part of application Ser. No. 49,176, filed Aug. 12, 1960, now abandoned.

This invention relates to a novel series of active antibacterial agents derived by reaction of certain of the mitomycin group of antibiotics with certain classes of amines. More particularly, this invention is concerned with novel compounds which may be represented by the following general formula:

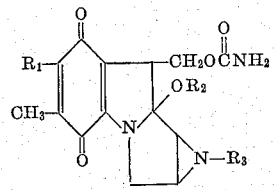

wherein $R_1$ is selected from the group consisting of phenyl lower alkylamino, N-lower alkyl phenyl lower alkylamino, lower dialkylamino lower alkylamino, carboxy lower alkylamino, lower alkyleneimino, cyclo lower alkylamino, hydroxy lower alkylamino, pyridylamino, pyridyl lower alkylamino, quinolylamino, morpholino, piperazino and a moiety of the formula:

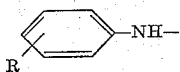

wherein R is selected from the group consisting of hydrogen, halogen, lower alkyl, lower alkoxy and lower carboalkoxy; $R_2$ is selected from the group consisting of hydrogen and methyl; and $R_3$ is selected from the group consisting of hydrogen, lower alkyl and phenyl lower alkyl. Suitable lower alkyl, lower alkylene, lower alkoxy, lower alkanoyl and lower carboalkoxy groups contemplated by the present invention are those having up to about six carbon atoms. Halogen is exemplified by chlorine, bromine and iodine.

Certain of the starting materials for the preparation of the novel compounds of this invention are in themselves novel antibiotics produced by cultivation of appropriate strains of *Streptomyces verticillatus* ATCC Nos. 13,495; 13,538 and 13,539. These novel elaboration products, formerly designated β, $γ_1$, and $γ_2$, are now known, respectively, as mitomycin A, mitomycin B and porfiromycin. Structure elucidation of mitocycins A, B and C and porfiromycin is described by J. S. Webb et al. in J.A.C.S., 84, 3185 (1962).

Another class of suitable starting materials for the preparation of the novel products of this invention are the N-substituted derivatives of mitomycin A and mitomycin C which form the subject matter of the copending application of Meyer et al., Ser. No. 200,631 filed June 7, 1962, now Patent No. 3,226,393.

For convenience, the structures of the mitomycins and porfiromycin referred to above are reproduced below.

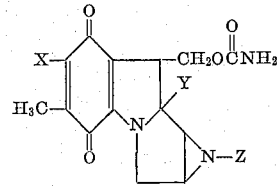

| Compound | X | Y | Z |
|---|---|---|---|
| Mitomycin A | $H_3CO$ | $OCH_3$ | H |
| Mitomycin B | $H_3CO$ | OH | $CH_3$ |
| Mitomycin C | $H_2N$ | $OCH_3$ | H |
| Porfiromycin | $H_2N$ | $OCH_3$ | $CH_3$ |

The N-substituted derivatives of mitomycin A and mitomycin C may be represented by the following general formula:

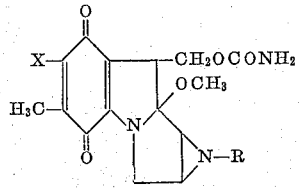

wherein X is lower alkoxy or amino, and R is lower alkyl, lower alkanoyl, phenyl lower alkyl, benzoyl, phenyl carbamoyl, lower alkyl sulfonyl, phenyl sulfonyl and lower carboalkoxy.

In accordance with the present invention, we have discovered that it is possible to prepare highly useful antibacterial agents by reaction of the foregoing group of antibiotics with primary and secondary amines.

The novel antibiotics of this invention are, in general, colored crystalline solids of relatively limited solubility in water, but somewhat more soluble in lower alkanols, ethyl acetate, acetone, toluene, benzene, chloroform, and the like.

The amines which may be reacted with the five starting antibiotics are primary and secondary amines which may be aliphatic (acyclic or isocyclic), aromatic, heterocyclic, or mixed (for example: aralkyl, alkaryl, aliphatic-aromatic, aliphatic-heterocyclic, aromatic-heterocyclic, aliphatic-aralkyl, etc.), including polyfunctional amines such as hydroxyalkylamines, haloarylamines, amino acids, and the like. Excluded are tertiary amines, quaternary ammonium compounds, ammonia, and such inorganic substitution products of ammonia as hydroxylamine, hydrazine, chloroamine, and the like.

It is an advantage of this invention that the novel reaction products may be prepared for the most part in simple reaction media. Ordinarily water is used as a reaction medium, but other liquids such as lower alkanols, ethyl acetate, benzene, toluene, chloroform, or the like can be used.

Typically, the starting material is dissolved in a suitable volume of water, and any excess of amine either alone or dissolved in water or other suitable solvent is added with stirring. Very often the progress of the reaction is accompanied by a visible color change or a shift in the ultra violet absorption spectrum. In general, after the reaction is completed or largely completed, the reaction medium and excess reactant may be removed by vacuum distillation and the product may then be recovered by conventional means such as crystallization, chromatography, and the like. The novel antibiotics of this invention and the starting antibiotics are sensitive to acid and to high temperatures, and in consequence, care must be taken to avoid their exposure to these two conditions. When distillation is employed, for example, to remove reaction medium and excess reactant, a high enough vacuum should be maintained to keep the temperature low.

The novel antibiotics of this invention have broad-spectrum activity against a number of microorganisms and thus are useful antibacterial agents. The new antibiotics show in vitro activity in standard, scientifically recognized microbiological assays, against the following organisms:

Klebsiella pneumoniae "A" strain AD
Bacillus cereus ATCC 10702
Mycobacterium smegmatis ATCC 607
Streptococcus pyogenes β hemolyticus
Escherichia coli ATCC 9637
Salmonella gallinarum
Staphylococcus aureus ATCC 6538
Pseudomonas aeruginosa ATCC 10145
Streptococcus faecalis
Staphylococcus albus No. 69
Streptococcus sp. β hemolyticus No. 80
Staphylococcus aureus NY 104
Corynebacterium xerose
Streptococcus sp. α hemolyticus
Escherichia coli No. 22
Bacillus subtilis ATCC 6633
Alcaligenes faecalis ATCC 10153
Proteus vulgaris ATCC 9484
Sarcina lutea ATCC 9341

The novel antibiotics of this invention are active against gram-positive and gram-negative microorganisms, such as staphylococci, pneumococci, and streptococci. The novel compounds are thus potentially useful as therapeutic agents in treating bacterial infections in humans and animals caused by such microorganisms. The compounds can be usefully employed for controlling such infections by topical application or internal administration.

The usefulness of the novel compounds is demonstrated by their ability to control systemic lethal infections in mice. Thus the novel antibiotics of this invention show very high antibacterial in vivo activity in mice against Staphlococcus aureus, strain Smith, ranging by direct comparisons from about ½ to about 8 times the activity of tetracycline. Although the novel antibiotics of this invention have not as yet been clinically demonstrated to be useful in human therapy, the conditions of the tests in mice against human pathogens show a high probability of useful activity in humans. The invention will be described in greater detail in conjunction with the following specific examples.

EXAMPLE 1

1.5 parts of mitomycin A are dissolved in 1,000 parts of water and 100 parts of aniline added with shaking. The purple solution which is the characteristic color of mitomycin A gradually changes color to green. When the reaction is complete the reaction mixture is frozen and dried in the frozen state, resulting in a green oil which contains the crude antibiotics with the excess unreacted aniline. The crude antibiotics are then separated chromatography using a diatomaceous earth packed column and a system consisting of 1 part heptane, 4 parts ethyl acetate, 3 parts methanol and 2 parts water. On the column, the product appears as a fast moving green band.

The first fraction from the column is then rechromatographed and green crystals of the new antibiotic are obtained. When dissolved in various solvents the following absorption bands are noted:

$\lambda_{max.}^{MeOH}$ 214, 259, 376 m$\mu$; $\lambda_{max.}^{NaOH}$ 373 m$\mu$; $\lambda_{max.}^{HCl}$ 262, 373 m$\mu$ The infrared spectrum is as follows:

$\lambda_{max.}^{KBr}$ 2.90, 3.40, 5.84, 6.09, 6.38, 6.61, 6.90, 7.54, 7.92, 9.38, 9.70, 12.40, 14.30$\mu$ The antibiotic when examined by chromatography in a system containing 200 parts of benzene, 50 parts of isoamyl alcohol and 100 parts of water showed an $R_f$ of 0.82. This compares with the $R_f$ of the starting material under the same conditions which is 0.72.

EXAMPLE 2

One part of mitomycin B is dissolved in water and excess ethyleneimine is added. The color changes rapidly from purple to pale blue. After one and one-half hours the ultraviolet maximum has moved out to 365 m$\mu$ from the initial position of 320 m$\mu$. The solvent and excess reagent are then removed in vacuo to give a new green antibiotic residue. The crude antibiotic is then purified by chromatography or recrystallized as in Example 1. The ultraviolet spectrum of the new antibiotic exhibits maxima at 218, 365 and 530 m$\mu$ in methanol, whereas mitomycin B exhibits maxima at 218, 320 and 537 m$\mu$ in methanol. The new antibiotic is active against bacteria such as Bacillus subtilis. The $R_f$ of the new antibiotic is 0.47 as against 0.64 for mitomycin B when run on paper strips as in Example 1.

EXAMPLE 3

The procedure of Example 1 is repeated using a series of different reagents. The results appear in the following table, the $R_f$ number being obtained by paper chromatography using the system described in Example 1.

TABLE I

| Reagent | Color | U.V. $\lambda MeOH_{max}$ | | | | $R_f$ |
|---|---|---|---|---|---|---|
| None | Purple | 212 | 320 | 520 | | 0.74 |
| Aniline | Green | 214 | 259 | 376 | 560 | .82 |
| Isopropanolamine | Purple | 247 | 310 | 550 | | .79 |
| Cyclohexylamine | Brown | | 365 | | | .90 |
| 3-aminoquinoline | Yellow | | 350 | 540 | | .83 |
| 4-aminopyridine | Tan | | 350 | 525 | | .84 |
| Glycine | Gray | 258 | | | | .65 |
| Piperazine | Green | | 335 | | | .88 |

EXAMPLE 4

The procedure of Example 2 is repeated with a number of other reagents. The results appear in Table II, the $R_f$ numbers being taken with the same system as in Example 1.

TABLE II

| Reagent | Color | U.V. $\lambda MeOH_{max}$ | | | | $R_f$ |
|---|---|---|---|---|---|---|
| Aniline | Green | 218 | (260) | 382 | | .77 |
| Ethanolamine | Blue | 218 | (242) | 368 | 550 | .80 |
| Morpholine | Green | 220 | (240) | 368 | 530 | .66 |
| Cyclohexylamine | Gray | 221 | | 370 | | .85 |
| 3-aminopyridine | Orange | | | 362 | 540 | .81 |
| Benzylamine | Green | (218) | 245 370 | 300 540 | 310 | .84 |
| Ethyleneimine | do | 218 | (240) | 365 | 530 | .47 |
| Piperazine | do | 218 | (246) | 363 | 550 | .01 |

EXAMPLE 5

One part of porfiromycin is dissolved in 1000 parts of water and a large excess of reagent in aqueous solution is added with stirring. After standing protected from light for fifteen hours, the solution is dried from the frozen state to obtain a new colored crude antibiotic which is purified by chromatography as in Example 1. The ultraviolet spectra of the new antibiotics exhibit characteristic maxima in methanol and have characteristic $R_f$ values in the same system as in Example 1. In this same system porfiromycin has an $R_f$ of 0.68. The new antibiotics are active against bacteria such as *Bacillus subtilis*.

This procedure is followed using different reagents. The results are tabulated in Table III, the $R_f$ values being measured in the same system as in Example 1.

TABLE III

| Reagent | Color | U.V. $\lambda MeOH_{max}$ | $R_f$ |
|---|---|---|---|
| Aniline | Yellow | 216 (231) 359 | .54 |
| Cyclohexylamine | Purple | 212 (230) 355 | .76 |
| Morpholine | Colorless | (240) 356 | .55 |
| 3-aminopyridine | Yellow | 357 | .70 |
| Piperazine | Colorless | 216 (240) 358 | .56 |

EXAMPLE 6

One part of mitomycin C is dissolved in 1000 parts of water and an excess of reagent is added with stirring. The reaction is allowed to stand for fifteen hours in the dark and then the solvent is removed by drying from the frozen state to obtain the new antibiotics as colored solids. The crude antibiotics are purified by chromatography. The new antibiotics show characteristic ultraviolet spectra in methanol. Mitomycin C has an ultraviolet spectrum in methanol which shows maxima at 215, 358 and 550 m$\mu$. The new antibiotics have characteristic $R_f$ values in the system of Example 1, the $R_f$ of mitomycin C in that system being 0.38. The new antibiotics are active against bacteria such as *Bacillus subtilis*.

This procedure is followed using different reagents. The results are tabulated in Table IV, the $R_f$ values being measured in the same system as in Example 1.

TABLE IV

| Reagent | Color | U.V. $\lambda MeOH_{max}$ | $R_f$ |
|---|---|---|---|
| Aniline | Purple | 215 (232) 357 550 | .38 |
| Morpholine | Pink | (242) (270) 343 | .38 |

EXAMPLE 7

A 5 mg. sample of N-methyl mitomycin A is dissolved in 0.5 ml. of morpholine, and allowed to react at 20° C. for 18 hours. A single, 6.3 mg. peak is obtained when partition chromatographed on a Celite column using a heptane:ethyl acetate:methanol:water system (40:60:15:6)

EXAMPLE 8

A 25 mg. sample of N-methyl mitomycin A is dissolved in 3 ml. of methanol and then cooled to 0° C. A 1 ml. portion of N,N-dimethylethylenediamine is added and the reaction allowed to proceed at 20° C. for 18 hours. The crude product, obtained upon evaporation of the solvent is purified by partition chromatography to give a 19.2 mg. homogeneous product.

EXAMPLE 9

A 27.1 mg. sample of N-methyl mitomycin A is dissolved in 5 ml. of methanol and to this is added 4.6 mg. of ethanolamine in 0.5 ml. of methanol. The reaction is allowed to stand for 18 hours at 20° C. and then purified by chromatography. A 21.4 mg. homogeneous product is obtained.

EXAMPLE 10

A 2.0 mg. sample of N-methyl mitomycin A is dissolved in 0.5 ml. of cold methanol and excess sodium glycinate added. The reaction proceeds at 20° C. for 18 hours.

EXAMPLE 11

A 25 mg. sample of mitomycin A is dissolved in 1.5 ml. of methanol and cooled to 0° C. A ml. sample of N,N-dimethylethylenediamine is added and the reaction allowed to proceed at 5° C. for 18 hours. The solvent is removed. The product dissolves in benzene and re-precipitates by the addition of excess petroleum ether (30–60° C.). This crude sample is purified chromatographically to yield 22 mg. of pure product.

EXAMPLE 12

To a solution of 1.1 parts of 4-aminomethylpyridine in 100 parts of methanol is added a solution of 0.44 parts of N-benzyl mitomycin A in 100 parts of methanol. The red solution is allowed to stand for 20 hours at room temperature. The solvent is removed by drying from the frozen state, and excess amine is removed by trituration with petroleum ether (30–60° C.) to give the crude yellow antibiotic which is then chromatographed as in Example 1. The ultraviolet spectrum of the new antibiotic exhibits maxima at 363 and 590 m$\mu$ in methanol, whereas N-benzyl mitomycin A exhibits maxima at 320 and 525 m$\mu$ in methanol. The $R_f$ of the new antibiotic is 0.47 as compared with 0.27 for N-benzyl mitomycin A when run as in Example 1. The new antibiotic is active against bacteria such as *Bacillus subtilis*.

EXAMPLE 13

The procedure of Example 12 is repeated using different reagents with the N-benzyl mitomycin A. The data obtained are shown in Table V below.

TABLE V

| Starting Material | Reagent | Color of Product | U.V. $\lambda^{MeOH}_{max}$ m$\mu$ | $R_f$ (Bio-autograph) |
|---|---|---|---|---|
| N-Benzyl mitomycin A | None | Red | 320 525 | .27 |
| Do | p-Bromoaniline | Orange | 250 347 475 | .01 |
| Do | p-Anisidine | Green | 255 380 590 | .26 |
| Do | 4-aminomethyl-pyridine | Yellow | 363 590 | .47 |
| Do | N-methyl-benzylamine | Brown | 368 590 | .22 |
| Do | Ethyl p-amino-benzoate | Orange | 350 450 | .25 |

A number of tests were made with some of the new antibiotics compared to one or more starting materials. Table VI shows inhibitory concentrations of the antibiotic porfiromycin and a new compound prepared by reacting porfiromycin with p-toluidine.

TABLE VI

| | Porfiromycin | Porfiromycin plus p-toluidine |
|---|---|---|
| *Mycobacterium smegmatis* ATCC 607 | 0.31 | 0.31 |
| *Staphylococccus aureus* ATCC 6538P | 0.15 | 0.15 |
| *Sarcina lutea* ATCC 9341 | 0.62 | 0.62 |
| *Bacillus subtilis* ATCC 6633 | 0.02 | 0.02 |
| *Streptococcus faecalis* ATCC 8043 | 1.25 | 0.62 |
| *Pseudomonas aeruginosa* ATCC 10145 | 5 | 10 |
| *Corynebacterium xerose* NRRL B1397 | 0.15 | 0.15 |
| *Streptococcus pyogenes* C203 | 0.02 | 0.01 |
| *Streptococcus* sp. $\gamma$ hem. No. 11 | 0.15 | 0.04p / 0.15 |
| *Staphylococcus albus* No. 69 | 0.31 | 0.31 |
| *Streptococcus* sp., $\beta$ hem. No. 80 | 0.04p / 0.15 | 0.04p / 0.15 |
| *Staphylococcus aureus* NY 104 | 0.31 | 0.31 |
| *Bacillus cereus* ATCC 10702 | 0.08 | 0.08 |
| *Streptococcus pyogenes* NY 5 | 0.01 | 0.01 |
| *Klebsiella pneumoniae* media lab No. 8 | 0.15 | 0.15 |
| *Alcaligenes faecalis* ATCC 10153 | 0.62 | 1.25 |
| *Escherichia coli* No. 22 | 10 | 10 |
| *Klebsiella pneumoniae* "A" Strain AD | 0.31 | 0.08p / 0.31 |

The data of Table VI is summarized in relative activity terms in Table VII.

TABLE VII

| | Porfiromycin | Porfiromycin plus p-toluidine |
|---|---|---|
| Mycobacterium smegmatis ATCC 607 | 8 | 8 |
| Staphylococcus aureus ATCC 6538P | 2 | 2 |
| Sarcina lutea ATCC 9341 | 1/32 | 1/32 |
| Bacillus subtilis ATCC 6633 | 8 | 8 |
| Streptococcus faecalis ATCC 8043 | 1 | 2 |
| Pseudomonas aeruginosa ATCC 10145 | 1/2 | 1 |
| Corynebacterium xerose NRRL B1397 | 1/4 | 1/4 |
| Streptococcus pyogenes C203 | 1 | 2 |
| Streptococcus sp., γ hem. No. 11 | 8 | 8 |
| Staphylococcus albus No. 69 | 1/2 | 1/2 |
| Streptococcus sp., β hem. No. 80 | 4 | 4 |
| Staphylococcus aureus NY 104 | 1 | 1 |
| Bacillus cereus ATCC 10702 | 16 | 16 |
| Streptococcus pyogenes NY 5 | 4 | 4 |
| Klebsiella pneumoniae media lab No. 8 | 4 | 4 |
| Alcaligenes faecalis ATCC 10153 | 1 | 1 |
| Escherichia coli No. 22 | 4 | 2 |
| Klebsiella pneumoniae "A" Strain AD | 4 | 4 |

Another test was made with some of the compounds produced by reacting with mitomycin B and here, as in the case of Tables VI and VII, there is a corresponding table giving relative activity for two of the compounds. The data appear in Tables VIII and IX.

A vs. the reaction product. The data appear in Tables X and XI.

TABLE X

| | Mitomycin A | Mitomycin A plus aniline |
|---|---|---|
| Mycobacterium smegmatis ATCC 607 | 0.62p | 1.25p |
| | 2.5 | 5 |
| Staphylococcus aureus ATCC 6538P | 0.31 | 0.08 |
| Sarcina lutea ATCC 9341 | 0.04 | 0.04 |
| Bacillus subtilis ATCC 6633 | 0.31 | 0.01 |
| Streptococcus faecalis ATCC 8043 | 1.25 | 0.15p |
| | | 2.5 |
| Pseudomonas aeruginosa ATCC 10145 | 10 | 5 |
| Proteus vulgaris ATCC 9484 | 1.25 | |
| Escherichia coli ATCC 9637 | >10 | |
| Salmonella gallinarum L-A-I- 604 | 10 | |
| Corynebacterium xerose NRRL B1397 | 0.04 | 0.08 |
| Streptococcus pyogenes C203 | 0.15 | 0.01 |
| Streptococcus sp. hem- No. 11 | 1.25 | 0.02p |
| | | 0.08 |
| Staphylococcus albus No. 69 | 0.31 | 0.08 |
| Streptococcus sp. β hem No. 80 | 1.25 | 0.02p |
| | | 0.08 |
| Staphylococcus aureus NY 104 | 0.31 | 0.08 |
| Bacillus cereus ATCC 10702 | 0.62 | 0.01 |
| Streptococcus pyogenes NY 5 | 0.04 | 0.02 |
| Klebsiella pneumonia media lab. No. 8 | 1.25 | 0.31 |
| Alcaligenes faecalis ATCC 10153 | 2.5 | 2.5 |
| Escherichia coli No. 22 | 1.25 | 0.62p |
| | | 2.5S |
| Klecsiella pneumoniae "A" Strain AD | 1.25 | 0.31 |

TABLE VIII

| Minimal Inhibitory Concentration of New Antiobitics Prepared from Mitomycin B and Standards | Mitomycin B | Mitomycin B plus aniline | Mitomycin B plus ethyleneimine | Mitomycin A |
|---|---|---|---|---|
| Corynebacterium xerose NRRL B1397 | 0.62 | 1.25 | 0.08 | 0.04 |
| Staphylococcus aureus ATCC 6538P | 5 | 1.25 | 1.25 | 0.62 |
| Sarcina lutea ATCC 9341 | 0.62 | 0.31 | 0.15 | 0.08 |
| Bacillus subtilis ATCC 6633 | 1.25 | 0.31 / 0.01p | 0.31 | 0.31 |
| Streptococcus pyogenes C203 | 0.15 | 0.04 | 0.04 | 0.02 |
| Streptococcus sp., γ hem. No. 11 | 2.5 | 0.62 | 0.31 | 0.62 |
| Staphylococcus albus No. 69 | 5 | 1.25 | 1.25 | 0.15 |
| Streptococcus sp., β hem. No. 80 | 1.25 | 0.62 | 0.31 | 0.62 |
| Staphylococcus aureus NY 104 | 10 | 2.5 | 2.5 | 0.31 |
| Bacillus cereus ATCC 10702 | 5 | 0.62 | 1.25 | 0.62 |
| Pseudomonas aeruginosa ATCC 10145 | | | 5 | 10 |
| Streptococcus faecalis ATCC 8043 | 10 | 5p | 1.25 | 1.25 |
| Streptococcus pyogenes NY 5 | 0.15 | 0.02 | 0.04 | 0.04 |
| Klebsiella pneumoniae media lab. No. 8 | 2.5 | 1.25 | 0.62 | 0.31 |
| Escherichia coli No. 22 | | | 10 | 10 |
| Alcaligenes faecalis ATCC 10153 | 10 | 10 | 5 | 5 |

TABLE IX

| Activity of New Antibiotics Prepared from Mitomycin B Relative to Mitomycin B | Mitomycin B plus Aniline | Mitomycin B plus ethyleneimine |
|---|---|---|
| Corynebacterium xerose NRRL B1397 | 1/2 | 8 |
| Staphylococcus aureus ATCC 6538P | 4 | 4 |
| Sarcina lutea ATCC 9341 | 2 | 4 |
| Bacillus subtilis ATCC 6633 | 4 | 4 |
| Streptococcus pyogenes C203 | 4 | 4 |
| Streptococcus ps. γ hem. No. 11 | 4 | 8 |
| Staphylococcus albus No. 69 | 4 | 4 |
| Streptococcus sp. β hem. No. 80 | 2 | 4 |
| Staphylococcus aureus NY 104 | 4 | 4 |
| Bacillus cereus ATCC 10702 | 8 | 4 |
| Pseudomonas aeruginosa ATCC 10145 | | |
| Streptococcus faecalis ATCC 8043 | | 8 |
| Streptococcus pyogenes NY 5 | 8 | 4 |
| Klebsiella pneumoniae media lab No. 8 | 2 | 4 |
| Escherichia coli No. 22 | | 2 |
| Alcaligenes faecalis ATCC 10153 | 1 | 2 |

Tests were also made with mitomycin A and a reaction product with aniline. As in Tables VI and VII, there is a corresponding table giving relative activity for mitocycin

TABLE XI

| | Mitomycin A plus aniline |
|---|---|
| Mycobacterium smegmatis ATCC 607 | 1/2 |
| Staphylococcus aureus ATCC 6538P | 4 |
| Sarcina lutea ATCC 9341 | 1 |
| Bacillus subtilis ATCC 6633 | 16 |
| Streptococcus faecalis ATCC 8043 | 2 |
| Pseudomonas aeruginosa ATCC 10145 | 2 |
| Corynebacterium xerose NRRL B1397 | 1/2 |
| Streptococcus pyogenes C203 | 1/2 |
| Streptococcus sp. γ hem. No. 11 | 16 |
| Staphylococcus albus No. 69 | 2 |
| Streptococcus sp. β hem. No. 80 | 16 |
| Staphylococcus aureus NY 104 | 4 |
| Bacillus cereus ATCC 10702 | 64 |
| Streptococcus pyogenes NY 5 | 2 |
| Klebsiella pneumoniae medium lab. No. 8 | 4 |
| Alcaligenes faecalis ATCC 10153 | 2 |
| Escherichia coli No. 22 | 1/2 |
| Klebsiella pneumoniae "A" Strain AD | 8 |

In the foregoing tables wherever the inhibition was not 100% complete the notation "p" is used to denote that the inhibition was partial although nearly complete.

U. V. data, where given, occasionally show a wave length in parenthesis. This denotes a point of inflection and not a clear maximum.

EXAMPLE 14

In vivo activity of the novel antibiotics of this invention was demonstrated by experiments carried out as follows:

Unit test groups consist of 5 or 10 Carworth Farms CF1 female mice averaging 18 to 21 grams of body weight per mouse. Infections are produced by intraperitoneal injections of 0.5 milliliter volumes of a $10^{-2}$ trypticase soy broth (TSP) dilution of a 5-hour blood broth culture of *Staphylococcus aureus*, strain Smith. The antibiotics in 0.2% aqueous agar are administered in single subcutaneous injection doses or single oral tubing doses one-half hour after infection. Control mice receive 0.2% aqueous agar without antibiotic.

The results obtained are shown in the table below.

TABLE XII

Effect on Mice of the Product of N-Methyl Mitomycin A and Morpholine Administered in Single Subcutaneous Doses and Single Oral Tubing Doses One-half Hour after Standard Infection with *Staphylococcus aureus*, Strain Smith

| Dose, mg./kg. | Survival after 6 Days Survivors/Total | |
|---|---|---|
| | Single Subcutaneous Doses | Single Oral Tubing Doses |
| 64 | | 4/5 |
| 32 | 5/5 | 1/5 |
| 16 | | 1/5 |
| 8 | 5/5 | 0/5 |
| 4 | | 0/5 |
| 2 | 3/5 | |
| 0.5 | 2/5 | |
| 0.12 | 0/5 | |

Controls.—95% (19/20) of infected non-treated control animals died in an average time of 1.0 to 1.2 days.

TABLE XIII

Effect on Mice of the New Antibiotics; The Product of N-Methyl Mitomycin A and β-Dimethylaminoethylamine, and N-Methyl Mitomycin A and Ethanolamine Administered in Single Subcutaneous Doses One-Half Hour after Standard Infection with *Staphylococcus aureus*, Strain Smith

| Dose, mg./kg. | Survival after 9 Days Survivors/Total | |
|---|---|---|
| | N-Methyl Mitomycin A plus β-Dimethylaminoethylamine | N-Methyl Mitomycin A plus Ethanolamine |
| 32 | 3/5 | 4/5 |
| 8 | 5/5 | 5/5 |
| 2 | 3/5 | 4/5 |
| 0.5 | 4/5 | 0/5 |
| 0.12 | 0/5 | 0/5 |

Controls.—100% (20/20) of infected non-treated control animals died in an average time of 1.0 day.

TABLE XIV

Effect on Mice of the New Antibiotics Mitomycin A and β-Dimethylaminoethylamine, and Mitomycin A and Aniline, Administered in Single Subcutaneous Doses One-Half Hour after Standard Infection with *Staphylococcus aureus*, Strain Smith

| Dose, mg./kg. | Survival after 14 Days Survivors/Total | |
|---|---|---|
| | A plus β-Dimethylaminoethylamine | A plus Aniline |
| 8 | | 10/10 |
| 4 | 8/10 | 6/10 |
| 2 | | 3/10 |
| 1 | 9/10 | 1/10 |
| 0.5 | | 2/10 |
| 0.25 | 3/10 | 0/10 |
| 0.12 | | 0/10 |
| 0.06 | 0/10 | |
| 0.015 | 0/10 | |

What is claimed is:

1. A compound of the formula:

[Structure: mitomycin core with $R_1$, $CH_3$, $CH_2OCNH_2$, $OR_2$, $N-R_3$ substituents]

wherein $R_1$ is selected from the group consisting of phenyl lower alkylamino, N-lower alkyl phenyl lower alkylamino, lower dialkylamino lower alkylamino, carboxy lower alkylamino, lower alkyleneimino, cyclo lower alkylamino, hydroxy lower alkylamino, pyridylamino, pyridyl lower alkylamino, quinolylamino, morpholino, piperazino and a moiety of the formula:

[Structure: phenyl ring with R substituent and —NH— group]

wherein R is selected from the group consisting of hydrogen, halogen, lower alkyl, lower alkoxy and lower carboalkoxy; $R_2$ is selected from the group consisting of hydrogen and methyl; and $R_3$ is selected from the group consisting of hydrogen, lower alkyl, and phenyl lower alkyl.

2. A compound of the formula:

[Structure: morpholino-substituted mitomycin with $CH_2OCNH_2$, $OCH_3$, $H_3C$, $NCH_3$]

3. A compound of the formula:

[Structure: $(CH_3)_2N-CH_2-CH_2-NH-$ substituted mitomycin with $CH_2OCNH_2$, $OCH_3$, $H_3C$, $NCH_3$]

4. A compound of the formula:

[Structure: $HOCH_2CH_2NH-$ substituted mitomycin with $CH_2OCNH_2$, $OCH_3$, $H_3C$, $NCH_3$]

5. A compound of the formula:

[Structure: $(CH_3)_2NCH_2CH_2NH-$ substituted mitomycin with $CH_2OCNH_2$, $OCH_3$, $H_3C$, $NH$]

6. A compound of the formula:
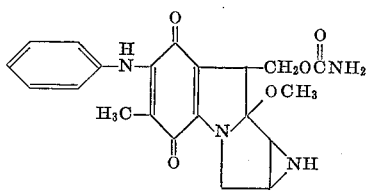
7. A compound of the formula:
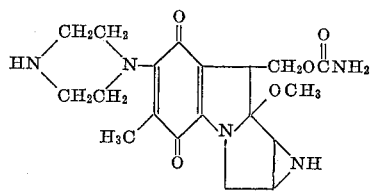
8. A compound of the formula:
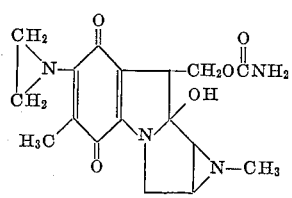
9. A compound of the formula:
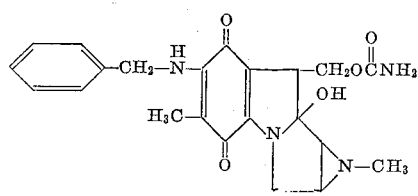
10. A compound of the formula:
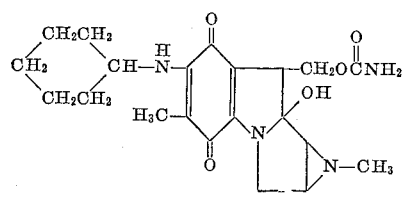
References Cited
UNITED STATES PATENTS
3,306,821   2/1967   Schoeder _____ 167—65
ALEX MAZEL, Primary Examiner.
H. R. JILES, Examiner.
M. U. O'BRIEN, J. TOVAR, Assistant Examiners.